Jan. 1, 1952     A. W. NIEMANN     2,581,133
GRAPHIC RECORDER WITH SLIDING COILS
Filed Nov. 2, 1950     2 SHEETS—SHEET 1
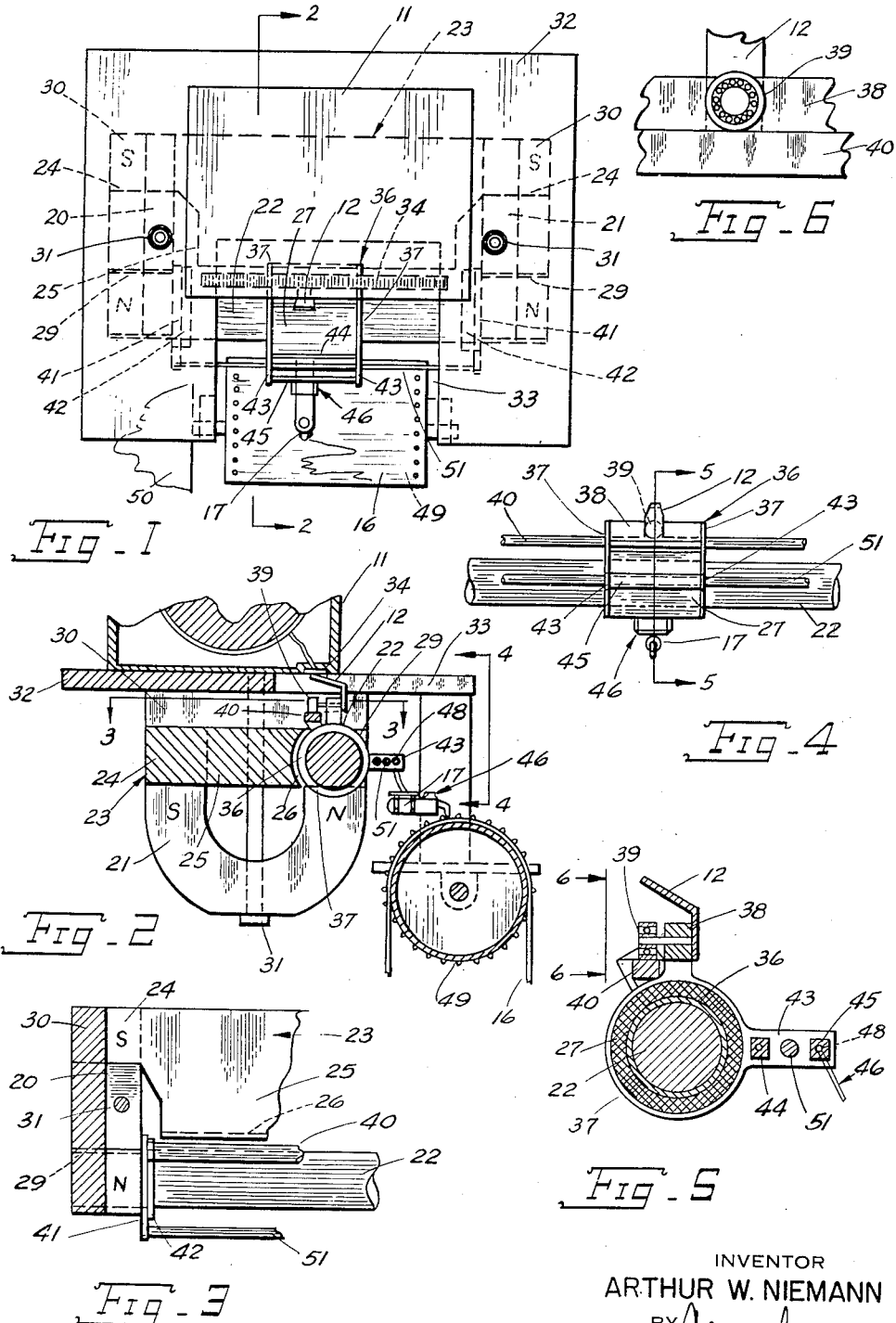
INVENTOR
ARTHUR W. NIEMANN Jan. 1, 1952        A. W. NIEMANN        2,581,133
GRAPHIC RECORDER WITH SLIDING COILS
Filed Nov. 2, 1950        2 SHEETS—SHEET 2
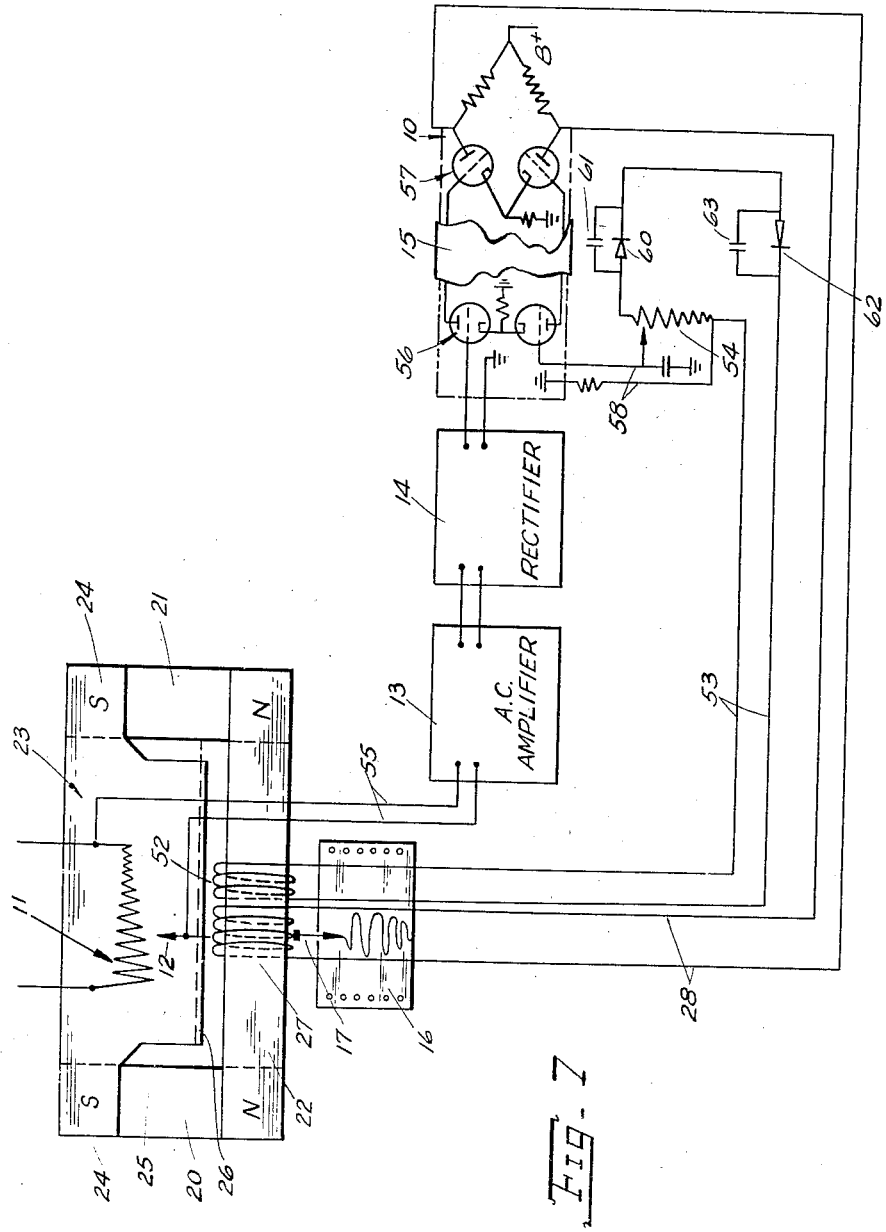
INVENTOR
ARTHUR W. NIEMANN
BY
ATTORNEY Patented Jan. 1, 1952

2,581,133

UNITED STATES PATENT OFFICE 2,581,133

GRAPHIC RECORDER WITH SLIDING COILS

Arthur W. Niemann, Millington, N. J., assignor to Sound Apparatus Company, Stirling, N. J., a firm Application November 2, 1950, Serial No. 193,549

5 Claims. (Cl. 346—32)

This invention relates to new and useful improvements in graphic recorders with sliding coils.

More particularly, this invention relates to those graphic recorders with sliding coils using an electrical bridge, an input potentiometer having an adjustable potentiometer arm, an electric amplifier electrically connected with said potentiometer and having an input including said potentiometer arm, and an output impressed on said electrical bridge, and recording means including a driven record sheet and a recording pen or stylus. Heretofore, in these prior graphic recorders it was customary to provide some means operated by the output of said electrical bridge and connected with said potentiometer arm for varying the input to said amplifier and bridge to seek to restore a balance in the bridge as the input voltage to said potentiometer changes. It was customary to connect the recording pen or stylus to said means in order to graphically imprint on said record sheet variations in the input to said potentiometer. This invention particularly proposes to improve the means connecting the output of the electrical bridge with the potentiometer arm to seek to restore the balance in the bridge.

Heretofore, the connecting means between the output of the bridge and the potentiometer arm, in one form of graphic recorder provided with a sliding coil, was in the form of pair of ring magnets positioned slightly axially spaced from each other with like poles adjacent and contacting with a ring shaped collar through which a rod engaged, said rod in turn had its ends connected with discs engaging the other like poles of the ring magnets. A coil was slidably mounted on the rod and connected with the output of the bridge. An arm was connected with one side of the coil and extended in a plane parallel with the axis of said rod and carried the recording stylus and the potentiometer arm. An important deficiency in a graphic recorder of this type is the excessive bulk of the ring magnets, the ring shaped collar connecting adjacent like poles of the magnets, and the end discs. Another defect resides in the binding tendency of said coil sliding on said rod due to the arm which is connected eccentrically with one side of the coil and which works parallel to the axis of the rod which supports the coil. Because of the length of this rod needed to come out from the ends of the discs there is an objectionable mechanical advantage tending to twist the coil from its axial position, causing said binding. The optimum position of the rod would be axially of the coil and axially through the rod upon which the coil slides. But this is not practical in a construction of this type.

Another important defect in prior graphic recorders with sliding coils was the lack of use of a dampening coil to cut down the speed of the driving coil when the latter was too fast. Prior devices merely made use of resistances connected in series with the coil which objectionably acted to also cut down the restoring force of the coil.

An important object of this invention resides in a novel arrangement of magnets so that the driving coil is exposed and accessible to carry the recording stylus and potentiometer arm with a minimum of length of these parts to cut down objectionable mechanical advantages.

This invention particularly proposes to provide a pair of spaced magnets, such as horseshoe magnets, or magnets or other designs, having like poles aligned but spaced from each other. It is proposed that a rod of magnetic material be attached to and magnetically connected with one pair of like poles of said magnets. It is further proposed that a bar of magnetic material be attached to and magnetically connected with the other pair of like poles of said magnets and be extended parallel to and very closely spaced to and along the side of said rod. With this arrangement it is possible to slidably mount a driving coil and a differential coil coaxially on said rod. It is pointed out that the magnetic field between the bar and the rod will be relatively uniform. It will vary slightly in strength from the ends of the bar and rod to the center. However, the driving coil which is mounted on the rod will merely move towards one or the other of the two like magnetic poles at the ends of the rod, depending upon which side of the driving coil is north or south at the moment of motion. The driving coil will move in that direction in which unlike poles attract each other, and like poles repel each other.

Another object of this invention resides in arranging both the recording stylus and potentiometer arm preferably at the center of the coils on said rod and arranging them so that they extend outwards of the axis of the rod in a plane substantially at right angles to the axis of the rod or coils. With this construction the pen or stylus and the potentiometer arm may be quite short. The mechanical advantage tending to bind the coil from moving on the rod, or tending to twist the coil out of its axial position will be relatively small in contrast with the same mechanical advantages in prior recorders.

Still another, and very important object of this invention resides in a novel arrangement for slidably supporting the coils so as to reduce friction to a minimum. It is contemplated that both coils be wound on one spool, and that this spool be provided with a ball bearing roller which rides upon a track so that the coil may move with a minimum of friction. It is further proposed that the ball bearing roller be positioned directly beneath the potentiometer arm so that the pressure required between the potentiometer arm and the potentiometer resistance be transmitted directly through the ball bearing roller to the track. It is also contemplated to provide one additional guide rod for slidably supporting the spool of the moving coils.

At this point it may be well to point out that the broad principal of operation of this new graphic recorder with sliding coil would also function if but one magnet instead of two were used. Of course, the efficiency of operation would be somewhat reduced. If one of the magnets were removed the relationship between the bar, the rod and the other magnet would not be disturbed. The driving coil and differential coil used in dampening would still be drawn to the magnetic pole at the end of the rod, or would be repelled from this magnetic pole, depending merely upon the direction of the current flowing in the driving coil, which determines whether or not the adjacent end of the driving coil is a north pole or a south pole at the moment. The removal of one of the magnets merely will make the magnetic field inefficient. It would now vary in strength from the magnet to the free ends of the bar and rod. The use of the second magnet merely makes the magnetic field more uniform in that then it varies in strength from the like strength at the ends of the rod and bar to their centers.

It may also be pointed out at this time that the magnets may be of any nature whatsoever, such as permanent, electro-magnets, etc.

Another object of the invention is the construction of a device as described which is simple and durable and which may be manufactured and sold at a reasonable cost.

For further comprehension of the invention, and of the objects and advantages thereof, reference will be had to the following description and accompanying drawings, and to the appended claims in which the various novel features of the invention are more particularly set forth.

In the accompanying drawings forming a material part of this disclosure.

Fig. 1 is a fragmentary plan view of a graphic recorder with a sliding coil constructed in accordance with this invention.

Fig. 2 is a fragmentary vertical sectional view taken on the line 2—2 of Fig. 1.

Fig. 3 is a fragmentary horizontal sectional view taken on the line 3—3 of Fig. 2.

Fig. 4 is a fragmentary elevational view looking in the direction of the line 4—4 of Fig. 2.

Fig. 5 is a fragmentary enlarged vertical sectional view taken on the line 5—5 of Fig. 4.

Fig. 6 is a fragmentary elevational view looking in the direction of the line 6—6 of Fig. 5.

Fig. 7 is a schematic wiring diagram of the device.

The graphic recorder with sliding coil, in accordance with this invention, includes an electrical bridge 10 (see Fig. 7), an input potentiometer 11 having an adjustable potentiometer arm 12, an electric amplifier 13, 14 and 15 electrically connected with said potentiometer 11 and having an input including said adjustable potentiometer arm 12 and an output impressed on said electrical bridge 10. The recorder is also provided with recording means including a driven record sheet 16 and a cooperative recording stylus or pen 17. The graphic recorder, as broadly described up to this point, is identical in construction to many prior graphic recorders, and forms no part of this invention.

The invention resides in the provision of a pair of spaced magnets 20 and 21 having like poles aligned but spaced from each other. A rod 22 of magnetic material is attached to and magnetically connects one pair of like poles of said magnets 20 and 21. A bar 23 of magnetic material is attached to and magnetically connects with the other pair of said like poles of said magnets 20 and 21 and extends parallel to and is closely spaced to and along one side of said rod 22. More particularly, the bar 23 has reduced ends 24 which are attached to the like poles of the magnets 20 and 21. The bar 23 has a central projecting portion 25 which extends towards and terminates close to the rod 22. This projecting portion 25 has a curved edge portion 26 (see Fig. 2) concentric with the axis of the rod 22 in order to be as close as possible to the side of a coil or coils mounted on the rod 22.

A drive coil 27 having an air core of a slightly larger size than said rod 22 coaxially engages upon said rod 22 and is connected by a circuit 28 with the output of the bridge 10. This drive coil 27 is positioned in the magnetic field between the rod 22 and the bar 23 in order to slide in one direction or the other on said rod 22 in accordance with changes in the current passing through the coil 27. Said recording pen or stylus 17 is fixedly mounted on and operated by the coil 27 in order to record the changes in the current passing through said coil 27, and furthermore said stylus 17 extends outwards of said coil 27 in a plane substantially at right angles to the axis of the coil 27. The potentiometer arm 12 is also fixedly mounted on the coil 27 in order to be moved by said coil to vary the input to said amplifier 13, 14 and 15 to seek to restore a balance in said bridge 10 as the input voltage to said potentiometer 11 changes, said potentiometer arm 12 extending outwards of said coil 27 in a plane substantially at right angles to the axis of the coil 27.

The ends of the rod 22 are attached to like poles of the magnets 20 and 21 by engaging into blocks 29 which in turn are attached to said poles of said magnets 20 and 21. Non-magnetic strips 30, as for example brass strips, are mounted across the blocks 29 and the end portions of the bar 23. Bolts 31 clamp the magnets 20 and 21, the blocks 29 and the bar 23 together with the strips 30 as a unit against a plate 32. This plate 32 is formed with a large cutout 33 through which a section of the rod 22 is visible. The potentiometer 11 is mounted on the top face of the plate 32. The potentiometer contact train 34 is positioned over the cutout 33 and above the rod 22 and extends parallel to said rod 22. The potentiometer arm 12 is in the form of a metal arm 12 which resiliently engages upwards against the potentiometer contact train 34.

The drive coil 27 is wound upon a spool 36 which is of a slightly larger diameter than said rod 22. This spool 36 is provided with side flanges 37. The spool 36 and side flanges 37 are made from non-magnetic material. A non-magnetic rod 38 is mounted across the side flanges 37. The potentiometer arm 12 is mounted on this rod 38. A ball bearing wheel 39 is also mounted on the rod 38 and rests against a track 40. This track 40 is mounted across non-magnetic brackets 41 which are mounted upon the ends of the rod 22. Adjacent to each bracket 41 there is a rubber washer 42 which acts as a stop should the flanges 37 of the spool 36 strike against said washers 42. The ball bearing wheel 39 is positioned directly beneath the potentiometer arm 12 so that down pressure on the arm 12 caused by its resiliently engaging the potentiometer resistance 34, is taken up efficiently by the track 40 without causing any binding between the spool 36 and the bar 22.

The flanges 37 are provided with projecting lugs 43 which support a pair of non-magnetic rods 44 and 45. A bracket 46 for supporting the pen or stylus 17, is mounted on the rod 45. The rod 45 is supported at its ends by pintle screws 48 in order that the rod 45 is pivotal so that the pen or stylus 17 may be pivoted upwards to an inoperative position, or downwards to engage upon the record sheet 16. The record sheet 16 engages about a drum 49 which is rotatively supported and connected with a drive means 50, not shown in detail, since these details form no part of this invention. A non-magnetic rod 51 engages through aligned openings in the lugs 43 in order to supplement the slidable mounting of the spool 36. The non-magnetic rod 51 is supported at its ends upon the brackets 41. The curvature 26 of the bar 23 is spaced as close as possible to the side of the coil 27.

A continuous and variable speed control, or dampening means, is provided for controlling the speed of the stylus 17. This speed control or dampening means includes a differential coil 52 wound upon the spoon 36 at a position adjacent to the coil 27. The coil 52 is connected in a circuit 53 in series with a speed control potentiometer 54. The potentiometer 54 is connected with the electric amplifier 15. The electric amplifier 13, 14 and 15 in the particular design of the graphic recorder illustrated, is composed of three distinct parts. The part 13 comprises an A. C. amplifier, the part 14 a rectifier, and the part 15 a push pull D. C. amplifier. The A. C. amplifier is connected by a circuit 55 with the potentiometer 11. The push pull D. C. amplifier 15 has a first stage indicated generally by the reference numeral 56, and the last stage indicated by the numeral 57. The potentiometer 54 is connected by a circuit 58 in series with one of the tubes of the first stage 56 of the push pull D. C. amplifier 15. The last stage 57 of the push pull D. C. amplifier 15 is connected with the input of the bridge 10.

In order to control the character of the dampening means of the stylus 17, a rectifier 60 (preferably a selium cell) is placed in series in the circuit 53. A condenser 61 shunts said rectifier 60. If desired a second rectifier 62 is placed in series in the circuit 53 and is arranged to act in the opposite direction to said rectifier 60. A condenser 63 shunts rectifier 62. The condensers 61 and 63 may have rates of discharge as desired to control the character of the dampening means. For example, the condensers 61 and 63 may dampen the action of the stylus 12 a greater amount when moving in one direction than when moving in the other direction. The recorder therefore may be designed to better show "tops" or "bottoms" on the recorded sheet, as desired.

All parts of the graphic recorder in close proximity to the magnets 20 and 21, the rod 22, and the bar 23, must be constructed of non-magnetic material so as not to divert the magnetic flux and so as to reduce to a minimum any binding tendency against sliding of the moving coils 27 and 52 and the spool 36 upon which these coils are mounted.

The operation of the graphic recorder may be understood from the following:

A change in the input to the potentiometer 11 will be amplified and rectified by the amplifier 13 and rectifier 14 and will be impressed upon the push pull D. C. amplifier 15, which in turn impresses the change upon the bridge 10. The tubes of the last stage 57 of the amplifier 15 will alternately vary plus or minus, depending on the impressed variation to the input to the potentiometer 11. These changes unbalance the bridge 10 and consequently a current will flow in one direction or in the other direction in the circuit 28 and in the drive coil 27. When current flows through the coil 27 in one direction, one end will become "north" and the other "south," and the coil 27 will move in one direction on the rod 22 so that its unlike poles of the coil 27 and the ends of the rod 22 attract each other and like poles repel each other. When current flows in the other direction in the coil 27 it will move opposite to the direction it has just moved. It is pointed out that the magnetic field along the length of the rod 22 will be relatively uniform because the magnetic flux will readily flow through the rod 22 and the bar 23.

When the coil 27 travels in one direction or the other it will correspondingly carry along the pen or stylus 17 and the potentiometer arm 12, since these parts are fixedly connected with the coil. When the drive coil 27 moves in one direction or the other it will move the differential coil 52 which sets up a current in the circuit 53 which is in proportion to the velocity of the coil 27. A current of a variable nature will therefore be generated in the coil 52, depending upon the motion of the coil 27, and this current will flow through the circuit 53 which may be controlled by the potentiometer 54 and which will be impressed upon the first stage 56 of the push pull D. C. amplifier 15. The poles of the magnets 20 and 21 may be so arranged that the current from the differential coil 52 will flow in the opposite direction to the current passing through the amplifier 15 in order to oppose the motion of the coil 27. For this reason the potentiometer 54 may be varied continuously to continuously vary the speed of the stylus 17 because the current from the coil 52 is used to dampen the motion of the coil 27. The rate of discharge of the condensers 61 and 63 controls the characteristics of the dampening means, to wit, the dampening effect may be varied depending upon the direction in which the differential coil 52 is moving. When the coil 27 moves it carries along the potentiometer arm 12 which seeks a new position so as to bring the bridge 10 back into balance. In this way the recorder continues for all changes in the input to the potentiometer 11 and records upon the driven record sheet 16.

An important feature of the invention resides in the relationship between the rod 22, the bar 23, and one of the magnets 20, or both of the magnets 20 and 21, in order to provide open spaces about the coil 27. Because of this open space the potentiometer arm 12 and the pen or stylus 17 may be mounted upon the coil 27 at a location preferably at the center of the spool 36 in a manner so that the recording stylus 17 and the potentiometer arm 12 are located in a plane substantially at right angles to the axis of the coil 27 and spool 36. With this construction the mechanical advantage from the potentiometer arm 12 to the spool 36 and from the recording stylus 17 to the spool 36 is at a minimum. Therefore any tendency for binding of the spool 36 on the rod 22 likewise is at a minimum.

Another important feature of the invention is the location of the ball bearing wheel 39 which efficiently supports the spool 26 so that it may slide with a minimum of friction coaxially of the rod 22. The provision of the rectifiers 60 and 62, and the condensers 61 and 63 to control the characteristics of the dampening means is also important.

While I have illustrated and described the preferred embodiment of my invention, it is to be understood that I do not limit myself to the precise construction herein disclosed and the right is reserved to all changes coming within the scope of the invention as defined in the appended claims.

Having thus described my invention, what I claim as new and desire to secure by United States Letters Patent is:

1. In a graphic recorder with sliding coil, a pair of spaced magnets having like poles aligned but spaced from each other, a rod of magnetic material magnetically connecting one pair of like poles of said magnets, a bar of magnetic material magnetically connecting the other pair of like poles of said magnets and extending parallel to and closely spaced to and along one side of said bar, a coil having an air core of a slightly larger size than said rod and coaxially engaging upon said rod and positioned in the magnetic field between said rod and bar in order to slide in one direction or the other on said rod in accordance with changes in current passing through said coil, means for sending a variable current through said coil for causing said coil to slide back and forth on said rod and means for dampening sliding of said coil, comprising another coil coaxially engaging on said rod and physically connected with and moved by said first-named coil, a circuit connected with said second coil, means operated by said circuit for opposing said variable current for dampening sliding of said first coil, a rectifier in series in said circuit, and a condenser shunting said rectifier.

2. A graphic recorder with a sliding coil, comprising an electrical bridge, an input potentiometer having an adjustable potentiometer arm, an electric amplifier electrically connected with said potentiometer and having an input including said adjustable potentiometer arm and an output impressed on said electrical bridge, recording means including a driven record sheet and a recording stylus, a magnet having north and south poles, a horizontal rod of magnetic material magnetically connected with one of said poles, a bar of magnetic material magnetically connecting with the other one of said poles and extending parallel to and closely spaced to and along one side of said rod, a drive coil having an air core of a slightly larger size than said rod and coaxially engaging upon said rod and connected with the output of said bridge and positioned in the magnetic field between said rod and bar in order to slide in one direction or the other on said rod in accordance with changes in the current passing through said coil, said recording stylus being mounted on and operated by said coil in order to record the changes in the current passing through said coil, and said potentiometer arm being mounted on and moved by said coil in order to vary the input to said amplifier to seek to restore a balance in said bridge as the input voltage to said potentiometer changes, means for dampening sliding of said coil, comprising another coil coaxially engaging on said rod and physically connected with and moved by said first-named coil, a circuit connecting with said second coil, means operated by said circuit for opposing said variable current for dampening sliding of said first coil, a rectifier in series in said circuit, and a condenser shunting said rectifier.

3. In a graphic recorder with a sliding coil, a magnet having north and south poles, a rod of magnetic material magnetically connected with one of said poles, a bar of magnetic material magnetically connected with the other of said poles and extending parallel to and closely spaced to and along one side of said rod, a coil having an air core of a slightly larger size than said rod and coaxially engaging upon said rod and positioned in the magnetic field between said rod and bar in order to slide in one direction or the other on said rod in accordance with changes in a variable current passing through said coil for causing said coil to slide back and forth on said rod, and means for dampening sliding of said coil, comprising another coil coaxially engaging on said rod and physically connected with and moved by said first named coil, a circuit connecting with said second coil, means operated by said circuit for opposing said variable current for dampening sliding of said first coil, a rectifier in series in said circuit, and a condenser shunting said rectifier.

4. In a graphic recorder with a sliding coil, a magnet having north and south poles, a rod of magnetic material magnetically connected with one of said poles, a bar of magnetic material magnetically connected with the other of said poles and extending parallel to and closely spaced to and along one side of said rod, a coil having an air core of a slightly larger size than said rod and coaxially engaging upon said rod and positioned in the magnetic field between said rod and bar in order to slide in one direction or the other on said rod in accordance with changes in a variable current passing through said coil for causing said coil to slide back and forth on said rod, and means for slidably supporting said coil for sliding with a minimum of friction along said rod, comprising a frame attached to said coil, a ball bearing wheel mounted on said frame, a non-magnetic track extending parallel to said rod and upon which said wheel rides, and another non-magnetic track extending parallel to said rod and passing through guiding openings in said frame.

5. In a graphic recorder with a sliding coil, a magnet having north and south poles, a rod of magnetic material magnetically connected with one of said poles, a bar of magnetic material magnetically connected with the other of said poles and extending parallel to said closely spaced to and along one side of said rod, a coil having an air core of a slightly larger size than said rod and coaxially engaging upon said rod and positioned in the magnetic field between said rod and bar in order to slide in one direction or the other on said rod in accordance with changes in a variable current passing through said coil for causing said coil to slide back and forth on said rod, and means for slidably supporting said coil for sliding with a minimum of friction along said rod, comprising a frame attached to said coil, a ball bearing wheel mounted on said frame, a non-magnetic track extending parallel to said rod and upon which said wheel rides, and another non-magnetic track extending parallel to said rod and passing through guiding openings in said frame, an electrical bridge, an input potentiometer having an adjustable potentiometer arm, an electric amplifier electrically connected with said potentiometer and having an input including said arm and an output impressed on said bridge, said potentiometer arm being mounted on and moved by said coil in order to vary the input to said amplifier to seek to restore a balance in said bridge as the input voltage to said potentiometer changes, said potentiometer being positioned above said first named track and having its arm mounted on said frame at a point above said wheel.

ARTHUR W. NIEMANN.

REFERENCES CITED

The following references are of record in the file of this patent:

UNITED STATES PATENTS

| Number | Name | Date |
| --- | --- | --- |
| Re. 12,235 | Weston et al. | June 21, 1904 |
| 1,320,291 | Swan | Oct. 28, 1919 |
| 1,740,456 | Griebach | Dec. 24, 1929 |